Oct. 30, 1962 C. E. MILTON 3,060,911
ROTARY INTERNAL COMBUSTION MOTOR
Filed Aug. 11, 1960 4 Sheets-Sheet 1

INVENTOR.
Carl E. Milton
BY
ATTORNEY

Oct. 30, 1962   C. E. MILTON   3,060,911
ROTARY INTERNAL COMBUSTION MOTOR
Filed Aug. 11, 1960   4 Sheets-Sheet 2
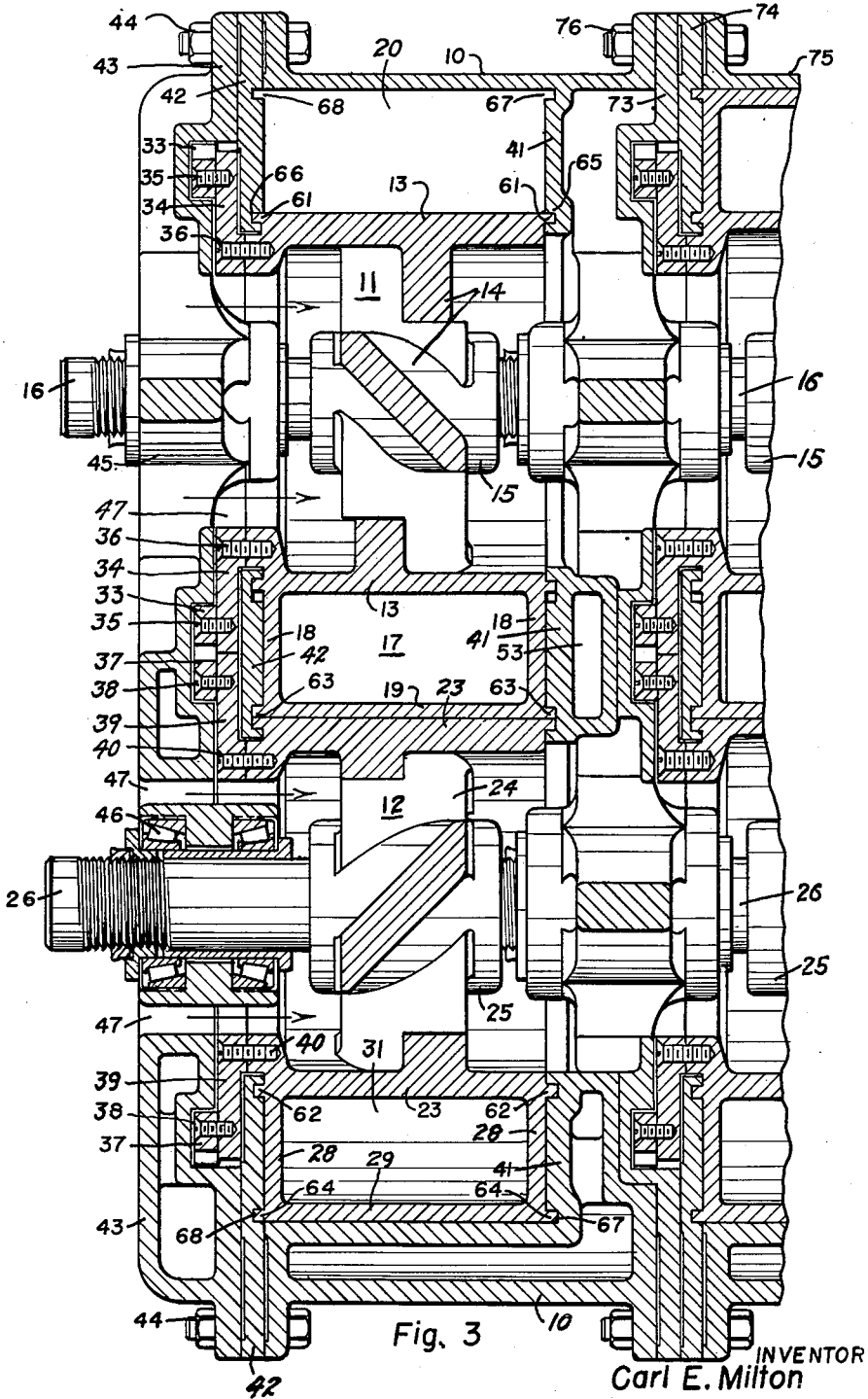
Fig. 3
INVENTOR
Carl E. Milton
BY
ATTORNEY Oct. 30, 1962   C. E. MILTON   3,060,911
ROTARY INTERNAL COMBUSTION MOTOR
Filed Aug. 11, 1960   4 Sheets-Sheet 3

Oct. 30, 1962          C. E. MILTON          3,060,911
ROTARY INTERNAL COMBUSTION MOTOR

Filed Aug. 11, 1960          4 Sheets-Sheet 4

INVENTOR.
Carl E. Milton
BY
ATTORNEY

United States Patent Office 3,060,911
Patented Oct. 30, 1962

3,060,911
ROTARY INTERNAL COMBUSTION MOTOR
Carl E. Milton, 838 Fillmore St., Denver 6, Colo.
Filed Aug. 11, 1960, Ser. No. 49,083
3 Claims. (Cl. 123—13)

This invention relates to a rotary internal combustion motor and has for its principal object the provision of a highly efficient internal combustion motor in which all reciprocating elements such as pistons, connecting rods, etc., will be completely eliminated and which will operate efficiently without the usual cam shafts, rocker-arms, push rods, etc., of the conventional internal combustion motor.

Another object of the invention is to provide a simple rotary motor construction consisting of only two driving elements which will operate smoothly and continuously with minimum vibration to deliver substantially increased power over that at present developed by conventional reciprocating piston engines of equal weight and size.

A further object is to provide rotary internal combustion motor units which can be coupled in tandem without change in the units to produce a power plant of any desired horsepower.

A still further object is to provide highly efficient sealing means for sealing the combustion gases in a rotary motor.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

FIG. 3 is an enlarged vertical longitudinal section through the unit and a portion of the attached tandem unit taken on the line 3—3, FIG. 4;

Figure 1:
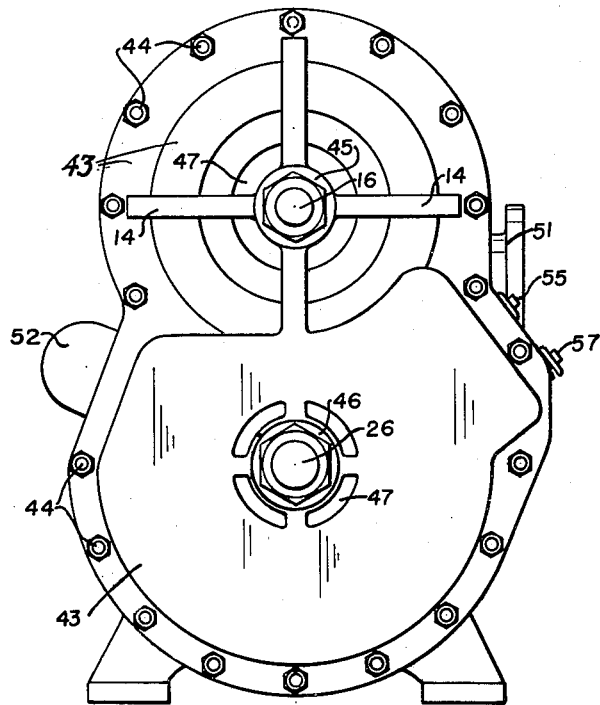
FIG. 1 is an end view of the improved rotary internal combustion motor.
Figure 2:
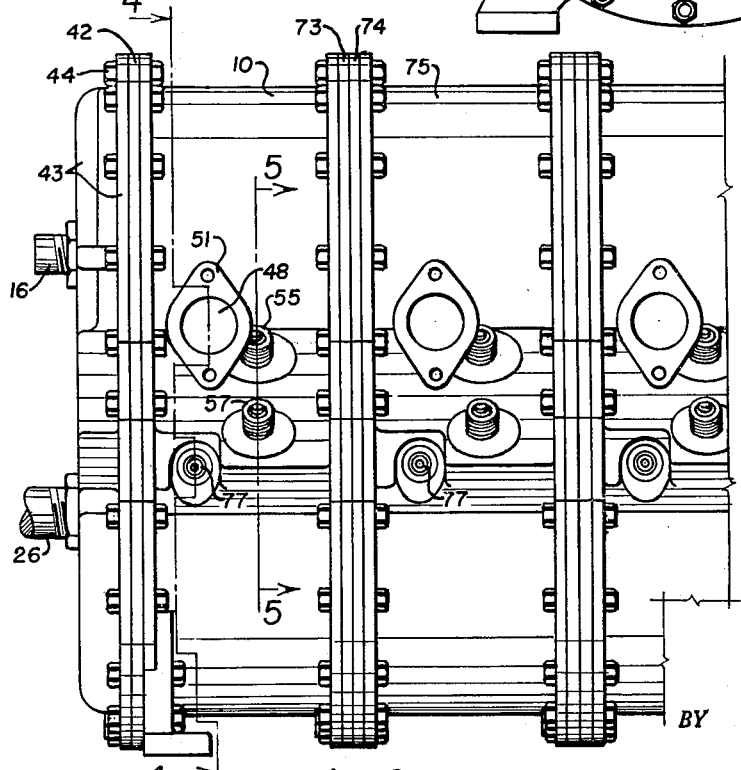
FIG. 2 is a fragmentary side view of a plurality of units of the motor partially broken away.

A single motor unit will be herein described it being understood that any desired number of the units may be combined in horizontal alignment along a power shaft to produce an engine of the desired total power requirement.

The motor comprises a rotor housing 10 provided with two internal circular overlapping rotor chambers. An intake rotor, designated in its entirety by the numeral 11, is rotatably mounted in one of the rotor chambers and a power rotor, designated in its entirety by the numeral 12, is rotatably mounted in the other of the chambers.

The intake rotor 11 comprises a cylindrical inner drum 13, of less diameter than the diameter of the chamber, supported on spokes 14 from a hub 15 keyed on a countershaft 16 concentric with the chamber. An arcuate compression piston portion 17 is formed on and extends substantially 220° about the circumference of the inner drum 13. The compression piston portion 17 has closed side walls 18 and an outer circumferential wall 19, in close bearing contact with the inner wall of the chamber, a trailing arcuate wall 20 and a leading arcuate wall 21. The interior of the chamber between the walls 20 and 21 forms an arcuate intake chamber 22.

The power rotor 12 is similar in construction to the intake rotor 11. It also comprises a cylindrical inner drum 23, of less diameter than the chamber, supported upon spokes 24 from a hub 25 keyed on a lower or power shaft 26 positioned concentrically of the second chamber. An arcuate power piston portion 27 is formed on and extends substantially 140° about the circumference of the inner drum 23. The power piston portion 27 of the rotor 12 has closed side walls 28 and an outer circumferential wall 29, in close bearing contact with the inner wall of the second chamber, a trailing arcuate wall 30 and a leading arcuate wall 31. The interior of the second chamber between the walls 30 and 31 forms an arcuate expansion and exhaust chamber 32.

The spacing between the shafts 16 and 26, in relation to the diameters of the inner drums 13 and 23 and the diameters of the piston portions 17 and 27, is such that the circumferential wall 19 of the piston portion 17 of the rotor 11 will ride in contact with the inner drum 23 of the rotor 12 for a substantially 220° of its rotation. The circumferential wall 29 of the piston portion 27 of the rotor 12 will then ride in contact with the inner drum 13 of the rotor 11 for the remaining 140° of the rotation.

The two rotors 11 and 12 are arranged to move in opposite directions in accurate synchronism in any desired manner. As illustrated, a ring gear 33 is attached to a ring plate 34 by means of suitable cap screws 35 and the ring plate 34 is concentrically mounted on the outer face of the intake rotor 11 by means of cap screws 36. A similar ring gear 37, intermeshing with first ring gear 33 is similarly concentrically mounted by means of cap screws 38 to a ring plate 39 mounted on the outer face of the power rotor 12 by means of cap screws 40 so that the two rotors rotate in unison.

The inside faces of the rotor chambers are closed by a partition plate 41 cast integrally with the housing 10 and the outside faces of the rotor chambers are closed by a face plate 42 positioned inside the ring plates 34 and 39 and clamped between the end of the rotor housing 10 and a housing head 43 by means of suitable head bolts 44.

The countershaft 16 and the power shaft 26 are journalled in the housing head 43 in suitable anti-friction bearings 45 and 46, respectively. The head 43 is provided with air passages 47 about the bearings 45 and 46 to allow air to flow freely through both rotors. The rotor spokes 14 and 24 are preferably angled to provide a propeller-like effect to draw air through the motor.

A fuel intake passage 48 communicates through the arcuate wall of the chamber containing the intake rotor 11 at a point adjacent the overlap point between the two chambers and at one side of the housing 10. An exhaust passage 49 communicates through the arcuate wall of the chamber containing the power rotor 12 at the opposite side of the housing 10 and adjacent the overlap point of the two chambers. The intake passage may be provided with a flanged intake neck 51 for connection with a conventional carburetor or other source of fuel. The exhaust passage may be connected to a conventional exhaust manifold 52.

A side port 50 opens through the partition plate 41 at the inside face of the intake rotor 11 adjacent the point of overlap of the two rotors. The side port 50 communicates with a side passage 53 leading to a compressed fuel chamber 54 formed in the housing 10 adjacent the point of overlap of the two chambers. A first spring-biased, inwardly-opening check valve 55 is positioned to allow unidirectional flow from the fuel chamber 54 to a compression pocket 56 and a second spring-biased, inwardly opening check valve 57 is positioned to allow unidirectional flow from the fuel chamber 54 to a firing pocket 58. The pockets 56 and 58 are formed in the wall of the housing at the periphery of the power rotor 12 adjacent the intake rotor 11 and the firing pocket is provided with a conventional spark plug 77.

A fuel transfer groove 59 is formed in the partition plate 41 extending from adjacent the place of contact between the intake rotor wall 19 and the power rotor drum 23 to the firing pocket 58. A scavenging groove 60 is similarly formed in the partition plate 41 extending from adjacent the place of contact between the intake rotor wall 19 and the power rotor drum 23 to the exhaust passage 49.

Operation

Figure 4:
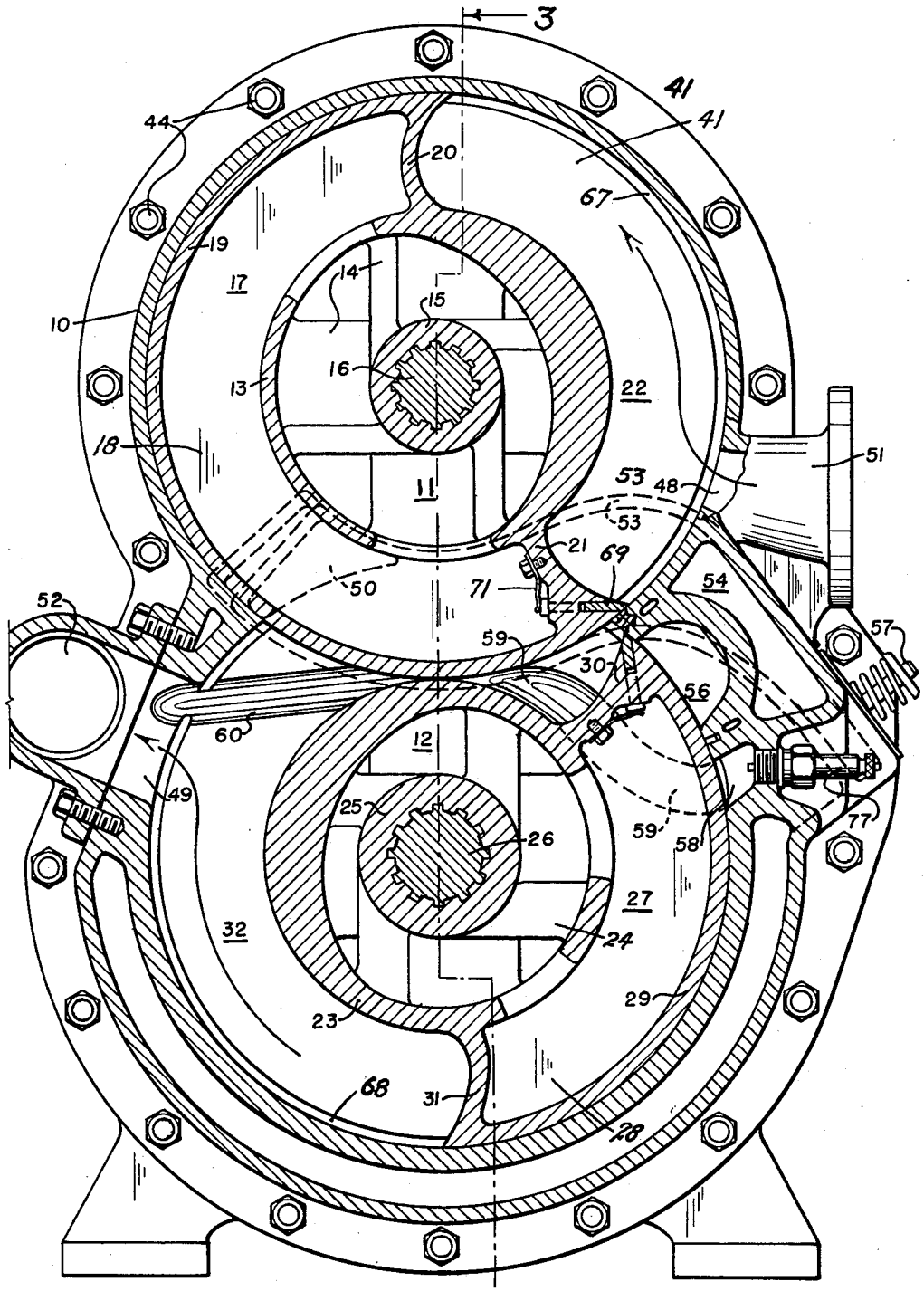
FIG. 4 is a cross section therethrough taken on the line 4—4, FIG. 2.
Figure 5:
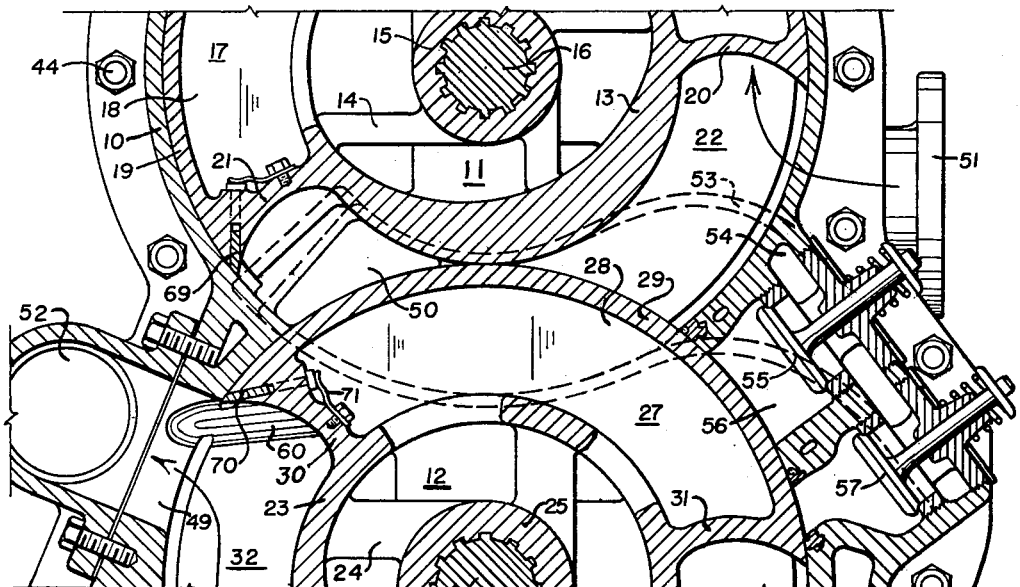
FIG. 5 is an enlarged fragmentary detail section taken on the line 5—5, FIG. 2.

Let us assume that the rotors 11 and 12 are in the position of FIG. 4 with the extremity of the transfer groove 59 uncovered by the piston portion 27 of the rotor 12. The spark plug now ignites the compressed gas in the firing pocket 58 and the groove 59 to create an initial combustion against the trailing wall 30. The piston portion 27 instantly uncovers the compression pocket 56 and the additional gas therein is ignited. The check valves 55 and 57 prevent fire back into the fuel chamber 54 and side passage 53. However, when the pressure differential has equalized additional gas will flow from the fuel chamber 54 to increase the combustion expansion. The expanding gas will be confined between the side walls of the rotor chamber of rotor 12 and between the circumferential wall 19 of the rotor 11 and the drum 23 of the rotor 12. Since the trailing wall 30 of the piston portion 27 of the rotor 12 is the only movable element, the expanding gases will force the portion 27 circumferentially to rotate the rotor 12 clockwise and, through the gears 33 and 37, the rotor 11 counterclockwise. The forward movement of the leading wall 31 of the rotor 12 will force the burnt gases of the previous explosion against the circumferential wall 19 of the rotor 11 and from the exhaust passage 49 and the rotor 11 will intake fresh gas shown in FIG. 4.

Figures 6, 8:
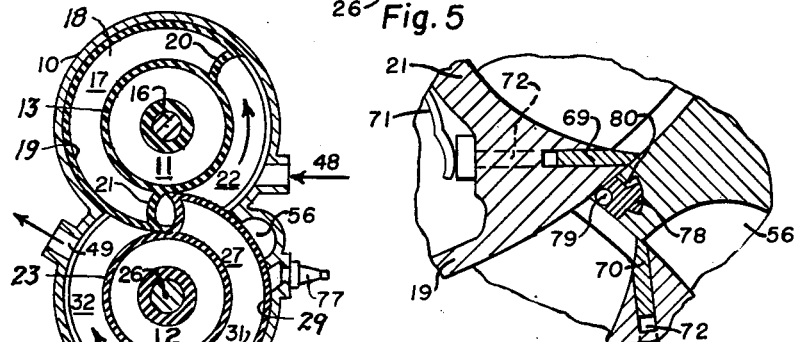
FIGS. 6 and 7 are diagrammatic views illustrating the positions of the operative elements during the intake and exhaust cycle, and the explosion cycle, respectively, of the motor.
FIG. 8 is an enlarged detail sectional view illustrating rotor sealing elements employed in the engine.
Figure 7:
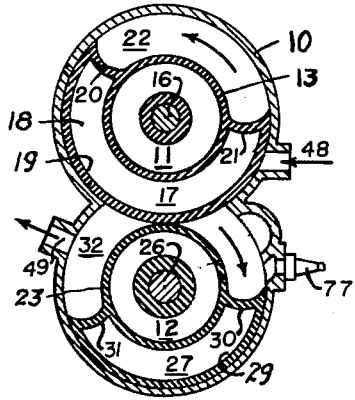

The rotation will continue, as illustrated in FIG. 7, to close the intake 48 and carry a charge of gas over the top of rotor 11 until the piston portion 17 of the rotor 11 uncovers the side port 50 so that the fresh gas can be forced through the latter into the side passage 53 and the fuel chamber 54 under pressure until the transfer point of FIG. 6 is reached after which the cycle will be repeated from the position of FIG. 4.

It is, of course, desirable to maintain a gas tight seal about the explosion chamber 32 at the time of ignition to conserve the combustion pressure for power purposes. It is also desirable to maintain a gas tight seal about the intake chamber 22 at the time of compression of the fuel gas into the side port 50.

In the embodiment illustrated, the sealing is accomplished by means of circumferential and transverse sealing elements. The circumferential and transverse sealing elements comprise annular, concentric inner sealing ridges or rings 61 and 62, formed on, surrounding, and projecting oppositely-outward from the peripheries of the opposite faces of the inner drums 13 and 23, respectively, and outer circumferential, oppositely-projecting sealing rings or ridges 63 and 64 formed on and projecting oppositely-outward from the opposite faces of the circumferential walls 19 and 29, respectively, of the rotors 11 and 12.

The sealing rings 61 and 62 are snugly fitted in circular inner ring grooves 65 and 66 formed in the partition plate 41 and the face plate 42, respectively. The sealing ridges 63 and 64 are similarly snugly fitted into circular, peripheral outer ring grooves 67 and 68 also formed in the partition plate 41 and the face plate 42, respectively, about the axes of the shafts 16 and 26. The rings 61 and 62, and the ridges 63 and 64 snugly sliding in their ring grooves 65, 66, 67 and 68 effectively prevent radial flow of gases from the chambers 22 and 32, similarly to piston rings and ring grooves in a conventional reciprocating piston.

The transverse sealing elements in the embodiment illustrated, comprise sealing bars 69 and 70 extending transversally of the outer lips of the leading wall 21 of the rotor 11 and the trailing wall 30 of the rotor 12, respectively. The sealing bars extend the full width of their respective chambers and they are tightly and frictionally fitted in transverse bar slots in the rotor walls and are resiliently urged against the inner circumferential walls of their respective chambers by means of suitable leaf springs 71 acting against bar stems 72 thereon. The sealing bars 69 and 70, effectively prevent "blow-by" of the gases during the compression and explosion cycles.

The above description is directed to a single motor unit. The countershaft 16 and the power shaft 26 can be extended, however, and additional, similar units can be mounted therealong in tandem relation. For instance, a second unit similar to the one above described can be added by attaching an intermediate plate 73 against the inside face of the housing, a second face plate 74 against the intermediate plate 73 and a second housing 75 against the second face plate 74 by means of suitable clamp bolts 76. The intermediate plate 73 would correspond to the housing head 43 previously described. The second face plate 74 would correspond exactly to the first face plate 42 and the internal elements of the second housing would be duplicates of, and would be mounted on the shafts 16 and 26 similarly to the elements previously described with reference to the housing 10. Additional housings could be similarly applied to combine any desired number of units.

It will be noted that there is a difference in the relative peripheral speeds between the inner drums 13 and 23 and the circumferential walls 19 and 29, respectively, due to the differing diameters. The ring plates 34 and 39, however, are of corresponding diameter and ride together without friction to maintain the accurate spacing between the rotors.

The sealing rings 61 and 62 and the sealing ridges 63 and 64 and their respective receiving grooves form a perfect seal against radial gas escapement. The large surface areas between the sides of the housing and the sides of the piston portions provide a seal against circumferential escapement. The latter seal may be enhanced if desired by placing radially extending sealing bars on the side walls 18 and 28 similar to the bars 69 and 70 previously described.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. An internal combustion motor comprising: a countershaft, a power shaft positioned in parallel, spaced relation to said countershaft; gearing connected to and causing said shafts to rotate in unison and in opposite directions; an intake rotor mounted on said countershaft; a power rotor mounted on said power shaft in the plane of said intake rotor; an arcuate intake chamber indented into the periphery of said intake rotor for a portion of its circumference; an arcuate power chamber indented into the periphery of said power rotor for a portion of its circumference, said shafts being so spaced that the non-indented portion of the intake rotor will ride in the power chamber of the power rotor for a portion of its rotation to divide the power chamber into an exhaust portion and an explosion portion and the non-indented portion of the power rotor will ride in the intake chamber of the intake rotor for the remaining portion of the rotation to divide the intake chamber into a compression portion and an intake portion; a housing enclosing said two rotors and closing the sides of said intake chamber and said power chamber; an intake port in said housing positioned to admit fuel to said intake portion; an exhaust port in said housing positioned to exhaust spent fuel from said exhaust portion; a by-pass in said housing communicating between said compression portion and said explosion portion; means for igniting the fuel in said explosion portion; check valve means in said by-pass for preventing fuel from flowing reversely therethrough; and a compression pocket opening to said explosion portion and receiving fuel from said by-pass and a firing pocket also receiving fuel from said by-pass and opening to said explosion portion subsequent to the opening of said compression pocket, said ignition means being located in said firing pocket.

2. An internal combustion motor as described in claim 1 having circular concentric ridges formed on both rotors and riding in circular ring grooves in said housing to seal said pockets.

3. An internal combustion motor as described in claim 1 having a first sealing bar mounted in said intake rotor and extending across the following edge of said intake chamber and a second sealing bar mounted in said power rotor and extending across the leading edge of said power chamber and resilient means urging said bars against said housing to seal said chambers thereto.

References Cited in the file of this patent

UNITED STATES PATENTS

| | | |
|---|---|---|
| 60,366 | Hardy et al. | Dec. 11, 1866 |
| 593,514 | Chaudun | Nov. 9, 1897 |
| 597,709 | Chaudun | Jan. 25, 1898 |
| 1,242,826 | Llewellyn | Oct. 9, 1917 |
| 1,473,486 | McCallen | Nov. 6, 1923 |
| 1,846,692 | Schmidt | Feb. 23, 1932 |
| 2,164,462 | Lutschg | July 4, 1939 |
| 2,380,752 | Grieb | July 31, 1945 |

FOREIGN PATENTS

| | | |
|---|---|---|
| 1,240 | Great Britain | 1885 |
| 289,359 | Italy | Oct. 14, 1931 |